J. G. JENNINGS.
Water Closets.

Patented March 25, 1873.

Witnesses
Jno. Alcock
Geo. Pitt

Inventor
Joseph George Jennings

J. G. JENNINGS.
Water Closets.

Patented March 25, 1873.

Witnesses.
Jno Alcock
Geo Pitt

Inventor.
Josiah George Jennings

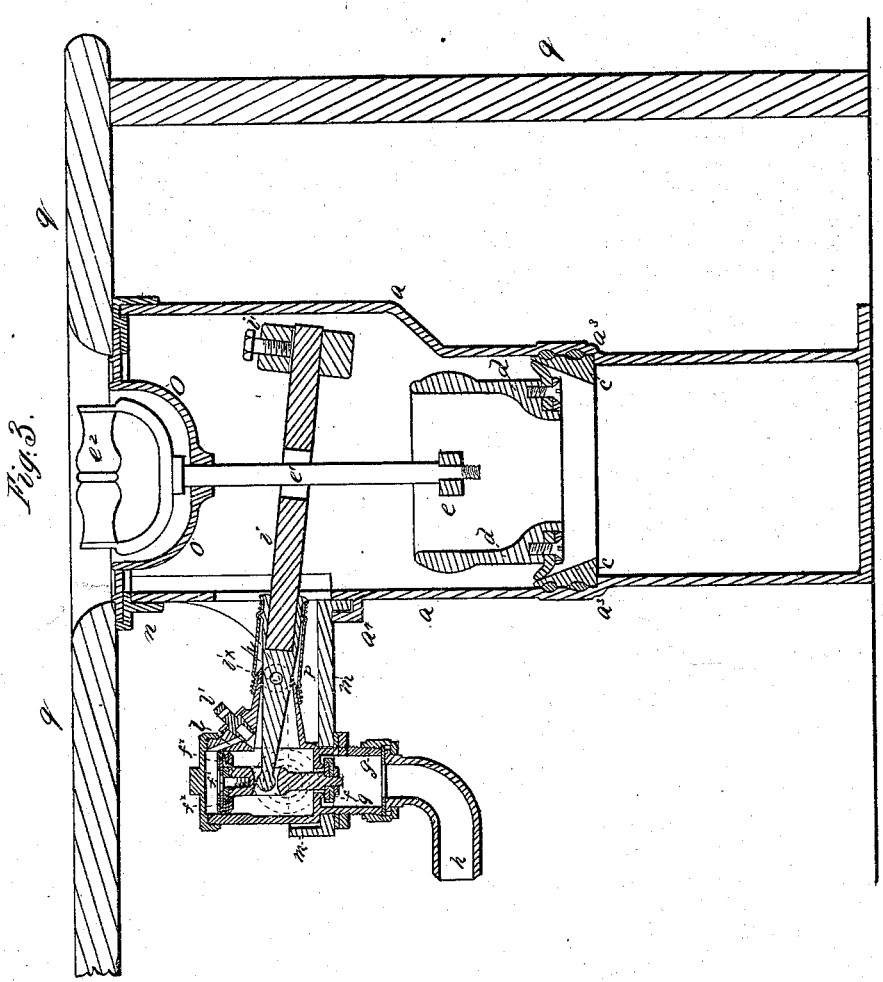

UNITED STATES PATENT OFFICE.

JOSIAH GEORGE JENNINGS, OF PALACE WHARF, STANGATE, ENGLAND.

IMPROVEMENT IN WATER-CLOSETS.

Specification forming part of Letters Patent No. 137,082, dated March 25, 1873.

*To all whom it may concern:*

Be it known that I, JOSIAH GEORGE JENNINGS, of Palace Wharf, Stangate, in the county of Surry, England, sanitary engineer, a subject of the Queen of Great Britain, have invented or discovered new and useful Improvements in Water-Closets; and I, the said JOSIAH GEORGE JENNINGS, do hereby declare the nature of the said invention, and in what manner the same is to be performed, to be particularly described and ascertained in and by the following statement thereof—that is to say:

This invention has for its object improvement in water-closets. My improvements in water-closets relate to closets in which the pan discharges itself by a side opening into the upright limb of a siphon-trap. According to my invention, I make the siphon-trap with its upright limb of cast-iron or lead, or other metal, and separate from the pan, and I connect the pan thereto by cementing it into a socket. The valve-seat is formed in the upright limb by cementing into it an earthenware or glass ring. The discharge-valve has an overflow-passage formed through it, and its handle passes up through a cap fitted onto the upper end of the upright siphon. The water-valve is carried on a bracket which fits on and against the upper end of the siphon-limb immediately under the cap, which serves to secure it in its place, and the valve is arranged in such a manner as to be opened by raising a lever which is so placed as to be lifted with the handle of the discharge-valve. The bracket is made of a trough-like form, so that, should the supply-valve leak at any time, the water so escaping is conducted at once into the trap. The connections between the supply-valve and the supply-pipe, and between the supply-valve and the pan, may be made by union screw-couplings.

This arrangement admits of the parts being very readily separated, as, when the unions are unscrewed, the whole of the working parts can be lifted out with the cap. As the whole of the working parts of the closet are within the upright limb and bracket above the siphon-trap, the closet may be inclosed in sawdust or other material to protect it from frost, when fixed in exposed situations, without interfering with the action of the working parts.

And in order that my said invention may be most fully understood and readily carried into effect, I will proceed to describe the drawing hereunto annexed.

*Description of the Drawing.*

Fig. 3 is a vertical section taken at the lines 2 2 of Figs. 1 and 2.

Figure 1:
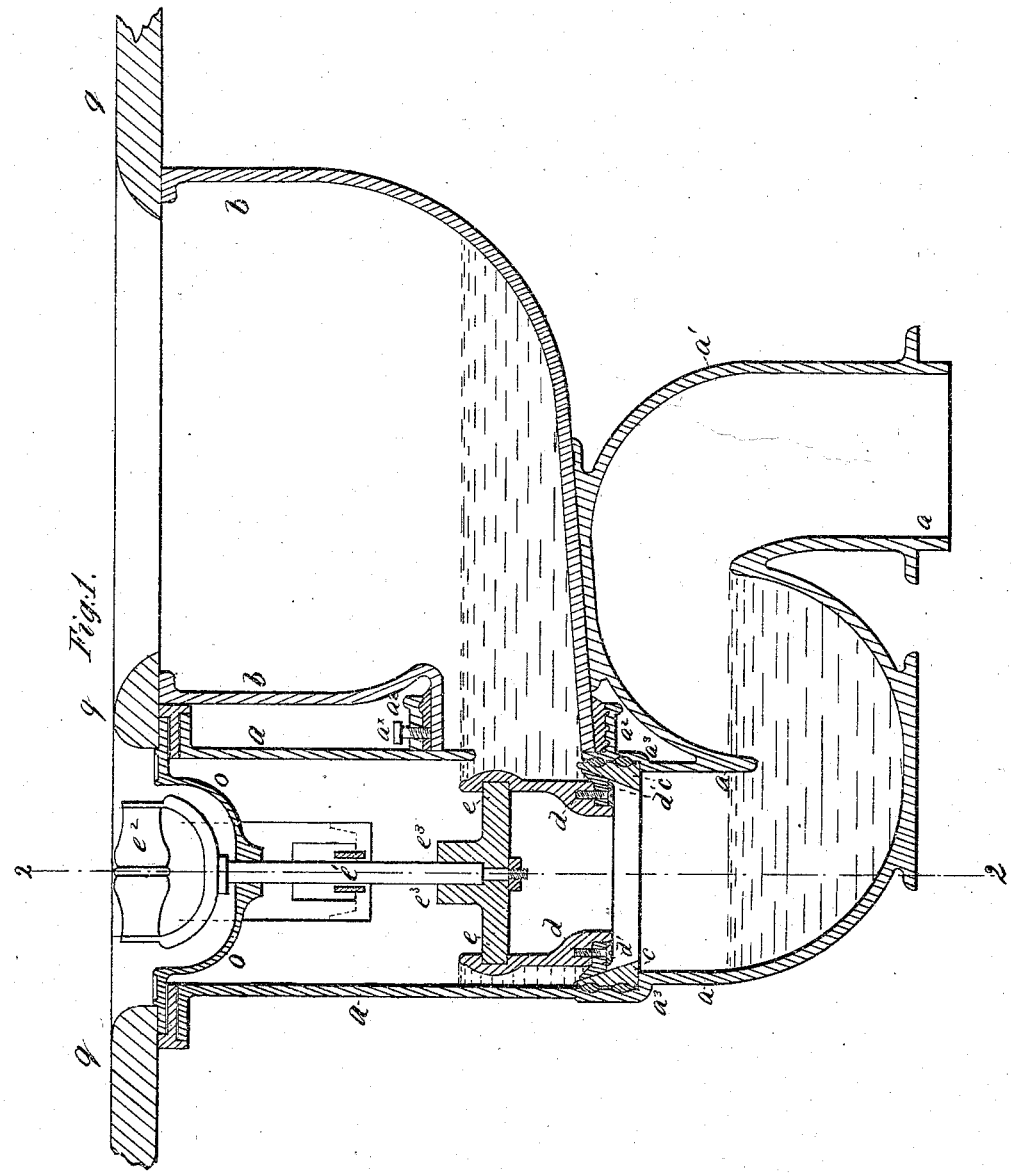
Figure 1 is a longitudinal section of a water-closet constructed according to my invention. This section is taken at the line 1 1, Fig. 2.
Figure 2:
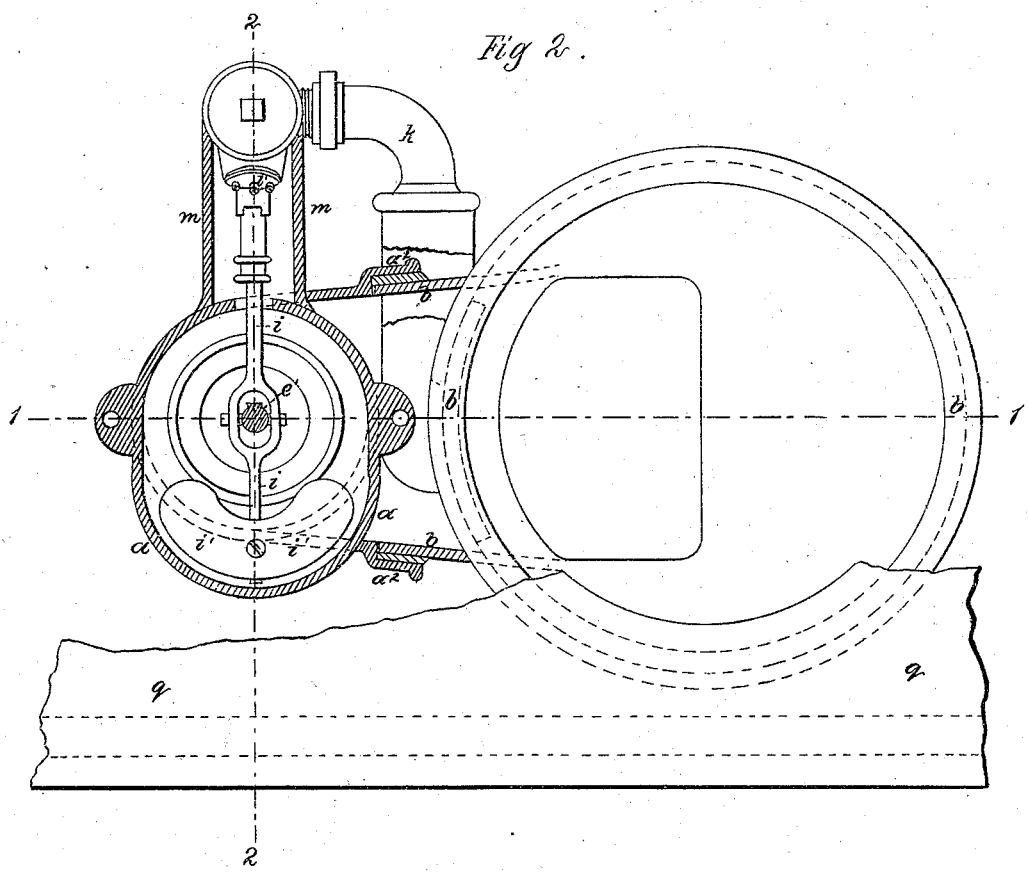
Fig. 2 is a plan, partly in section.

$a\ a$ is a siphon, which I prefer to cast in iron, and it is so represented in the drawing; but it may be of lead or other metal. It is formed so as to stand firmly on the floor of the closet, through which the descending limb $a^1$ of the trap passes, and by cement, or in other convenient manner, it is securely jointed to the soil-pipe. On the ascending limb of the siphon a socket is formed at $a^2$, into which the discharge-nozzle of the pan $b$ fits and is secured by cement. $a^\times$ is a screw for assisting in the adjustment of the pan in position before the cement is put in. $c$ is a ring of earthenware or of glass, which is dropped down onto a shoulder, $a^3$, in the ascending limb of the siphon-trap, and fixed by cement so as to form a valve-seat. $d$ is a cast-iron cylinder, to the lower end of which the vulcanized India-rubber ring $d'$ is clipped by screws which bind a metal ring or washer down upon it.

It will be seen that the cylinder $d$ by its own weight presses the flexible ring $d'$ against the seat $c$, and so makes a tight joint, and allows the water to accumulate in the pan $b$ until it flows over the top of the cylinder $d$.

$e$ is a cross-bar fixed in the cylinder $d$. To it the rod $e^1$ is secured by a nut, and the handle $e^2$ is at the upper end of this rod, so that, by raising the handle, the valve is lifted and the pan is at once discharged. The supply of water to the closet is obtained by a valve so arranged as to discharge each time it is opened a regulated quantity of water into the pan before it is again able to close. $f$ is the valve contained in the case $g$, which, by a screw-union, is connected with the supply-pipe $h$. The pressure of the water tends to keep the valve closed; but it is assisted in doing so by a weight, $i'$, at the end of the lever $i$. This lever turns on a center at $i^\times$ on the valvecases, and its other end enters a slot in the valve-stem, which, when the apparatus is at rest, it thus tends to lift. When the handle $e^2$ is raised, however, the nibs $e^3 e^3$ on the cross-bar come against the lever, and then the water flows past the valve $f$ and by the pipe $k$, which is adapted to the valve-case with a screw-union, into the pan $b$. At the same time that the valve $f$ is opened the piston $f'$ on the upper end of the valve-stem is drawn down. This piston, by a cupped leather, is fitted to the valve-case, and, as the piston descends, small valves $f^x f^x$ in it open and allow the water to pass the piston freely into the upper part of the valve-case. The valves $f^x$ are formed by a vulcanized India-rubber disk attached to the top of the piston by a screw, and covering holes drilled through it. The water which thus enters the upper part of the valve-chamber prevents the valve closing immediately the handle is released, for, the valves $f^x$ then closing, the water can only escape through the minute passage $l$; and it requires some time to do this, during which time the valve remains open. $l'$ is a small regulating-tap on the passage $l$. The valve-case $g$ and apparatus connected therewith are carried by a cast-iron bracket, $m$, which is let into the side of the ascending limb of the siphon. At the bottom it is stepped into a groove, $a^4$, and at the top it is retained by a cap, $n$, fixed on by tap-screw. $o$ is a lid or cover, also fixed by screws. It serves to close the upper end of the ascending limb of the siphon-trap, and also to guide the valve-rod $e^1$. $p$ is a vulcanized India-rubber sleeve, serving to prevent the escape of water around the pivot $i^x$. This, however, is not essential, as any leakage which may take place at this point is, in consequence of the trough-like form of the bracket $m$, led into the trap. $q$ is the seat and wood-work of the closet.

Having thus described the nature of my said invention, and the manner of performing the same, I would have it understood that I do not confine myself to the exact details thereof; but

What I claim is—

1. The non-corrosive valve-seat $c$ in the described combination with the valve $d$ and its lifting apparatus, bracket $m$, and water-supply valve $f$, as shown and explained.

2. The siphon-trap $a$, with a side opening or socket $a^2$ in the ascending limb thereof, to which a pan, $b$, is adapted, substantially as herein described.

JOSIAH GEORGE JENNINGS.

Witnesses:
G. F. WARREN,
THOS. BROWN,
Both of No. 17 Gracechurch street, London, England.